UNITED STATES PATENT OFFICE.

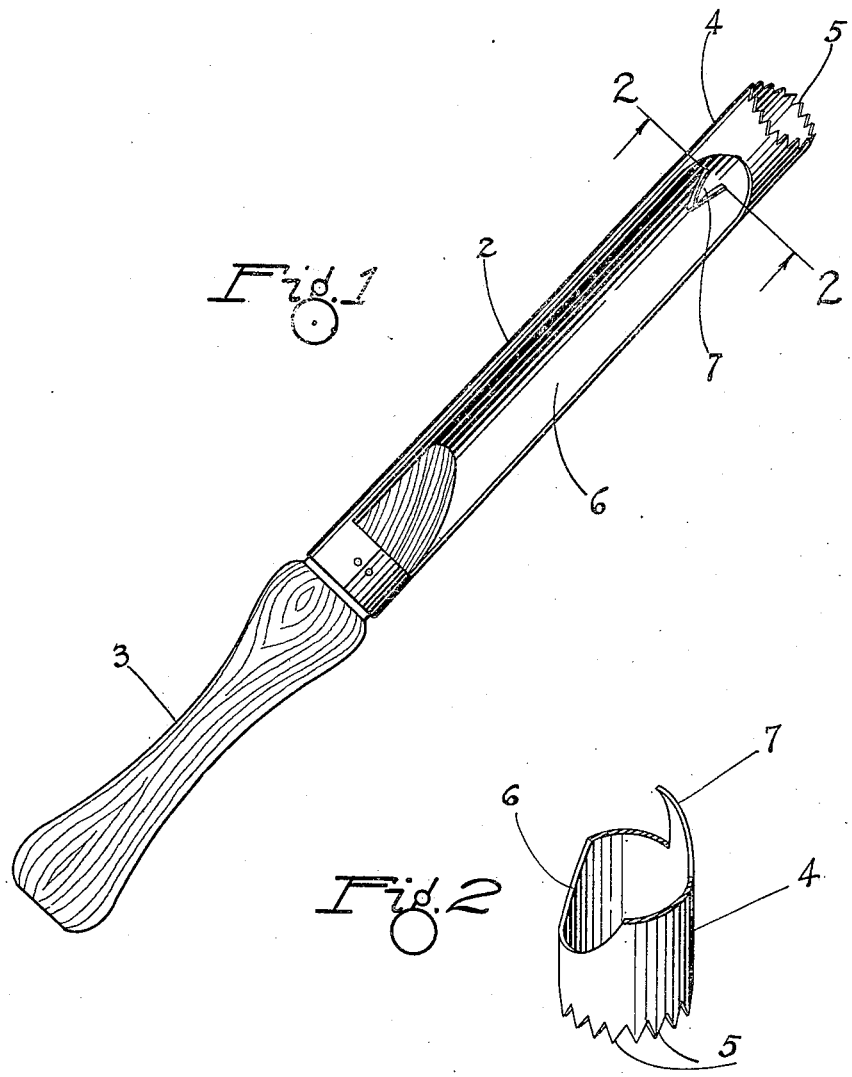

STEVE SZÜTZ, OF MINNEAPOLIS, MINNESOTA.

APPLE-CORER.

1,371,948.   Specification of Letters Patent.   Patented Mar. 15, 1921.

Application filed November 15, 1920. Serial No. 424,230.

*To all whom it may concern:*

Be it known that I, STEVE SZÜTZ, a citizen of the United States, residing at Minneapolis, county of Hennepin, State of Minnesota, have invented certain new and useful Improvements in Apple-Corers, of which the following is a specification.

The object of my invention is to provide means for easily and quickly removing the core of an apple.

A further object is to provide a device of simple, inexpensive construction and one which can be manufactured and sold at comparatively small expense.

The invention consists generally in various constructions and combinations, all as hereinafter described and particularly pointed out in the claims.

In the accompanying drawings forming part of this specification,—

Figure 1 is a perspective view of an apple corer embodying my invention,

Fig. 2 is a sectional view on the line 2—2 of Fig. 1.

In the drawing, 2 represents a tubular body, preferably of sheet metal, folded and secured to a suitable handle 3. The outer end of the member 2, indicated at 4, is cylindrical in form, having a continuous circular wall terminating in a serrated edge 5, forming teeth to penetrate the apple and encircle the core therein. In the rear of the cylindrical portion 4 the wall of the tubular member is cut away, as indicated at 6, to reduce the friction arising from the act of thrusting the corer through the apple and also to provide an opening through which the apple core may be discharged, when it is separated from the apple.

The wall of the tubular member opposite the opening 6 is provided with a tooth 7 that is pressed out of the metal and projects inwardly and backwardly in the form of a barb, so that when the device is thrust into the apple and pulled back, this barb will enter the core and insure its complete withdrawal from the apple.

The device may also be used for coring pears as well as apples.

I claim as my invention:

1. An apple corer comprising a tubular member having a cylindrical portion at one end terminating in a circular cutting edge, the wall of said tubular member being cut away in the rear of said cutting edge to provide an opening for the discharge of the core, and a short integral barb projecting rearwardly into the tubular member from a point opposite the forward end of the opening whereby to direct the core outwardly to engage in the end portion of the core being held by the circular forward end of the tubular member.

2. A fruit corer comprising a tubular member having a circular cutting edge and a side opening thereabove through which a core is to be discharged, and a barb provided on the interior of the lower, cutting edge and extending upwardly toward the core-discharging opening.

In witness whereof, I have hereunto set my hand this 10th day of November, 1920.

STEVE SZÜTZ.